US007936267B2

(12) United States Patent
Pasma

(10) Patent No.: US 7,936,267 B2
(45) Date of Patent: May 3, 2011

(54) THEFT PROTECTION

(75) Inventor: Andries Cornelis Pasma, Nuis (NL)

(73) Assignee: A.C. Pasma Holding B.V., Nuis (NL)

( * ) Notice: Subject to any disclaimer, the term of this patent is extended or adjusted under 35 U.S.C. 154(b) by 66 days.

(21) Appl. No.: 11/721,712

(22) PCT Filed: Feb. 19, 2007

(86) PCT No.: PCT/NL2007/000047

§ 371 (c)(1),
(2), (4) Date: Jun. 14, 2007

(87) PCT Pub. No.: WO2007/097615

PCT Pub. Date: Aug. 30, 2007

(65) Prior Publication Data

US 2009/0267766 A1 Oct. 29, 2009

(30) Foreign Application Priority Data

Feb. 20, 2006 (NL) .................................... 1031220

(51) Int. Cl.

*G08B 13/14* (2006.01)
*G06F 1/26* (2006.01)
*E05B 65/00* (2006.01)

(52) U.S. Cl. ............... 340/568.2; 340/568.1; 340/568.3; 340/571; 340/572.1; 726/34; 726/35; 726/36; 70/57; 70/57.1; 70/58

(58) Field of Classification Search .... 340/568.1–568.3, 340/572.1; 70/57, 57.1, 58; 726/34–36
See application file for complete search history.

(56) References Cited

U.S. PATENT DOCUMENTS

| | | | | | |
|---|---|---|---|---|---|
| 3,938,124 | A | * | 2/1976 | Way et al. | 340/531 |
| 4,639,713 | A | * | 1/1987 | Kitagawa et al. | 340/427 |
| 5,570,080 | A | * | 10/1996 | Inoue et al. | 340/571 |
| 6,337,633 | B1 | * | 1/2002 | Foseide | 340/687 |
| 6,459,374 | B1 | * | 10/2002 | Rand et al. | 340/568.2 |
| 6,578,394 | B2 | * | 6/2003 | Yin | 70/58 |
| 6,609,399 | B1 | * | 8/2003 | Daniels, Jr. | 70/49 |
| 6,971,255 | B2 | * | 12/2005 | Bhogal et al. | 70/58 |
| 7,135,971 | B2 | * | 11/2006 | Kim | 340/568.1 |
| 7,191,623 | B2 | * | 3/2007 | Francke | 70/18 |

* cited by examiner

*Primary Examiner* — Benjamin C Lee
*Assistant Examiner* — Lam P Pham
(74) *Attorney, Agent, or Firm* — Young & Thompson

(57) ABSTRACT

A theft protection for an electronic device, in particular an optionally portable computer, a mobile telephone or a PDA, includes an electrical cable (2) with a coupling connector (3) for coupling to a corresponding coupling connector of the device. Alarm elements are connected to the cable (2) which are able and adapted to generate an alarm signal in the case the device is stolen. The alarm elements (4) are accommodated in a housing (1) separate from the device. The housing is provided with fastening elements (5) for a mechanical connection of the housing to a fixed object (9). The alarm elements include detection elements which are adapted and able to detect an interruption of the electrical cable connection (2), in addition to signalling elements (4) which generate the alarm signal when the interruption is detected.

16 Claims, 1 Drawing Sheet

THEFT PROTECTION

BACKGROUND OF THE INVENTION

1. Field of the Invention

The present invention relates to a theft protection for an electronic device, in particular an optionally portable computer, a mobile telephone or a PDA, comprising an electrical cable with a coupling connector for coupling to a corresponding coupling connector of the device, and comprising alarm means connected to the cable which are able and adapted to generate an alarm signal in the case the device is stolen.

2. Description of the Related Art

Different types of protection have been proposed for the protection of electronic devices, in particular portable computers, from unlawful theft. Firstly, there are mechanically reinforced cables which are on the one hand attached to a fixed object and on the other engage with a lock in an opening of a lock plate arranged specifically in the device for this purpose. Although the device can hereby be firmly attached to a fixed object in its vicinity, such a solution has the drawback that securing the device is relatively time-consuming and requires a special modification to the device and that, with a sufficiently powerful cutter or other tool, the cable can moreover be broken without this being noticed and the device nevertheless stolen.

In order to avoid this latter in particular, there are also electronic theft protection devices which generate an audible alarm signal as soon as theft of the device is detected. Such an electronic theft protection is for instance known from American patent application US 2005/0073423. The theft protection described therein serves to protect a portable computer and comprises a movement sensor connected to the computer via a universal serial bus. As soon as the movement sensor detects a movement, an alarm report is generated to the computer, on the basis of which a routine loaded into the computer sounds an audible alarm signal via the computer speakers.

Although unnoticed removal of an active device will generally not be possible with such an electronic protection, this protection is also far from perfect. In the first place this known protection requires that the computer is in operation and the (battery) power supply of the portable computer is still sufficient to activate and maintain the alarm. The battery power supply will not infrequently be depleted or the computer will be switched off or in standby mode, in which case the theft protection is not in operation. Furthermore, the working of this known theft protection requires a software routine for this purpose to be loaded into the computer, whereby the protection is only suitable for computer equipment and must moreover be fully compatible with other software loaded therein and with the hardware of the computer.

SUMMARY OF THE INVENTION

The present invention has for its object, among others, to provide a theft protection with which these drawbacks are obviated to at least a significant extent.

In order to achieve the intended object a theft protection has the feature according to the invention that the alarm means are accommodated in a housing separate from the device, that the housing is provided with fastening means for a mechanical connection of the housing to a fixed object, that the alarm means comprise detection means which are adapted and able to detect an interruption of an electrical cable connection via the cable with the coupling connector to the corresponding coupling connector of the device, and that the alarm means comprise signaling means which generate the alarm signal when said interruption is detected. The theft protection according to the invention thus combines a mechanical fastening with an electronic alarm which monitors the integrity of this fastening. This theft protection can be coupled to an existing port of the device, which therefore requires no special modification for this purpose. Coupling and uncoupling of the theft protection according to the invention is hereby just as simple as coupling or uncoupling peripheral equipment or the like to and from the device, and in some cases can even be combined therewith.

The housing can be fastened to a fixed object in diverse ways and be provided for this purpose with similarly diverse fastening means. A particularly practical embodiment of the theft protection according to the invention has the feature however that the fastening means comprise a cable through-feed to the housing for receiving a loop of the cable therein. The cable through-feed forms as it were an eye through which the cable can be guided while simultaneously forming a loop which encloses a part of a fixed object. The outer end of the cable is thus connected non-releasably to the object and the device can be coupled to the object with interposing thereof.

In order to enable practical storage of a surplus length of cable during use or non-use of the theft protection, a further preferred embodiment of the theft protection according to the invention has the feature that the housing is provided with winding means for enclosing the cable in an at least partly rolled-up state, and more particularly that the housing forms a reel on which the cable is received in at least partly rolled-up state. The surplus length of cable can thus be trained round the winding means in simple manner so as to adjust the remaining length to the desired length.

The theft protection according to the invention can be supplied per se wholly independently of the device. It is however also possible to integrate the theft protection in a component which is usually coupled to the device. In this respect a further particular embodiment of the theft protection according to the invention has the feature that the housing of the alarm means also comprises an electric power supply for the device, and that the cable comprises a power supply cable of the device. Assumed here is an apparatus with an external electric power supply which has already been accommodated in a separate housing for this purpose and can be coupled to the device by means of an electrical cable. By also accommodating the electronic components of the theft protection in the same housing and providing the housing with effective fastening means, both a separate apparatus and an additional operation are dispensed with in protecting the device against theft. Although a comparable integration can be carried out in possible further peripheral equipment of the device, such as an external monitor or printer, an external power supply has the advantage that, other than possible peripheral equipment, it will normally always be carried with the device. A further integration is achieved here in a further particular embodiment of the theft protection according to the invention, which is characterized for this purpose in that the electric power supply is shared with the alarm means, and thus does not require a separate electric power supply.

In a further preferred embodiment the theft protection according to the invention is characterized in that the coupling connector comprises a universal serial bus connector and the corresponding connector comprises a universal serial bus port of the device. Such a USB port is available on practically all modem computer equipment, so that the theft protection can be applied relatively universally for this group of devices. A connection to a USB port moreover has the advantage that the operating system of a computer device usually actively monitors the status of the USB port connection, and can take predetermined action in the case this status changes. Use is advantageously made hereof in a further preferred embodiment of the theft protection according to the invention which is characterized in that a protection routine is loaded into the device, at least during operation, and is embodied to protect data present in the device against unauthorised access when an interruption of the cable connection is detected. Data possibly stored in the device are thus made immediately inaccessible when the cable connection is interrupted, for instance by encrypting or even completely deleting these data so that this information does not fall into the wrong hands either in the event the device is stolen. This is particularly important if confidential information is present in the device.

An alarm signal of varied nature can per se be applied within the scope of the invention in order to attract the attention of bystanders. In this respect a further embodiment of the theft protection according to the invention has the feature that the alarm means are adapted and independently able to generate at least one alarm signal from a group comprising an auditory signal, an optical signal and a vibrating alarm. In order to avoid the alarm means going off unintentionally when the rightful owner connects or disconnects the device, a further preferred embodiment of the theft protection according to the invention herein has the feature that the alarm means comprise (de)activating means which can only be operated by a rightful user. The alarm can thus be deactivated by the user, if desired, before the theft protection is disconnected.

BRIEF DESCRIPTION OF THE DRAWING FIGURES

Detailed Description of the Invention

The invention will now be further elucidated on the basis of an exemplary embodiment and an associated drawing. In the drawing.

The figures are purely schematic and not drawn to scale. Some dimensions in particular may be exaggerated to a greater or lesser extent for the sake of clarity. Corresponding parts are designated in the figures with the same reference numeral.

Figure 1:
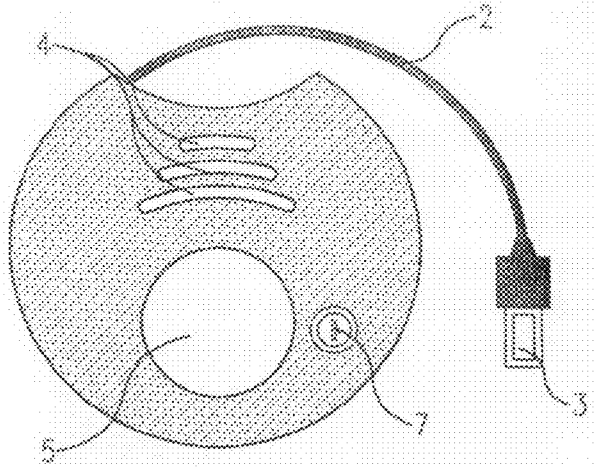
FIG. 1 shows a front view of an exemplary embodiment of a theft protection according to the invention.

FIG. 1 shows an embodiment of a theft protection according to the invention. The theft protection is wholly accommodated in a practical housing of plastic and, in addition to an electronic circuit with power supply (not further shown), comprises an electrical cable 2 with a coupling connector 3 which can be connected to a corresponding port of a device which has to be protected by means of the theft protection. In this example use is made for this purpose of a so-called USB connector for connection to a port of a universal serial bus (USB), with several of which computer equipment is generally equipped. When such a port is used for connector 3, sufficient ports will then usually still remain for connection of peripheral equipment and the like.

Connections other than a USB port, such as for instance audio and video outputs, a power supply connector and telecommunication ports, are however also suitable for coupling to the theft protection according to the device. What is important is that through connection of a suitable connector the theft protection creates a closed electrical loop which is then continuously monitored by the theft protection. As soon as an interruption in this loop is detected, for instance because the cable is broken or connector 3 is pulled out of the connection, this triggers alarm means of the theft protection which will then generate a alarm signal. In this example use is made for this purpose of a clearly audible alarm signal exiting loudspeaker openings 4 provided in the housing for this purpose with an intensity in the order of 100-120 dB. The alarm signal can optionally be supplemented with light signals from a light source then provided for this purpose in or on housing 1, such as a system of bright light-emitting diodes (LEDs).

Figure 2:
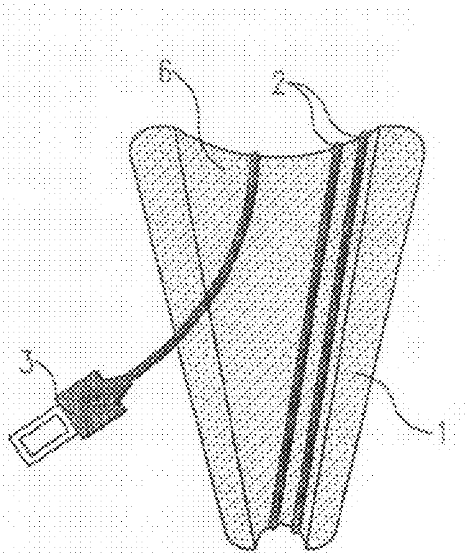
FIG. 2 shows a side view of the theft protection of FIG. 1.
Figure 3:
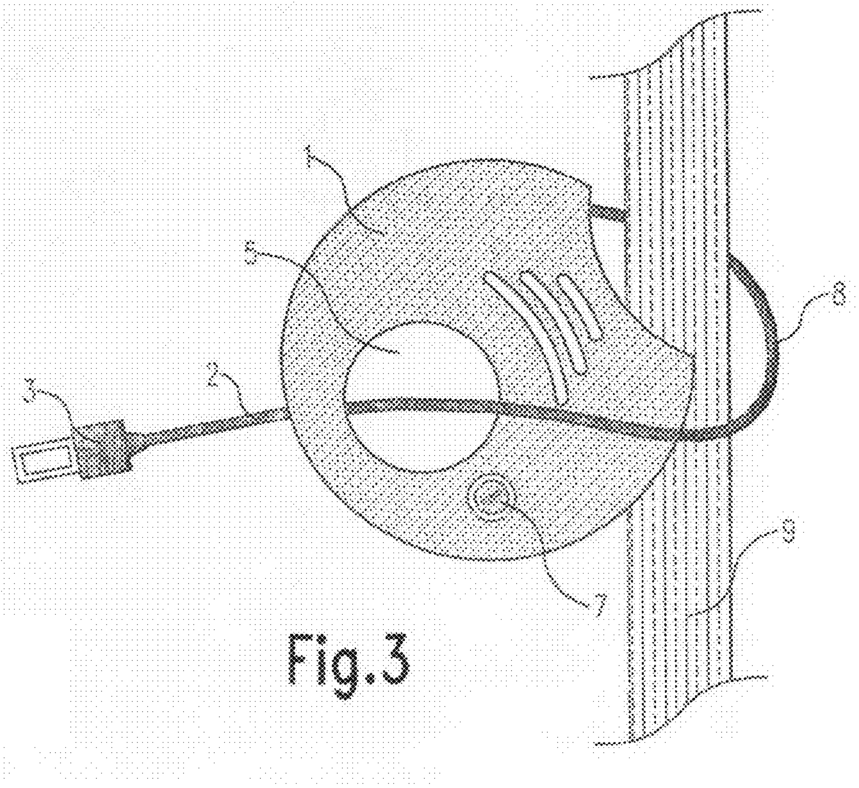
FIG. 3 shows the theft protection of FIG. 1 fastened to a fixed object.

In order to protect a device according to the invention the housing 1 is firmly connected to a fixed object such as for instance a table leg 9, see FIG. 3. The housing is provided for this purpose with fastening means in the form of a cable through-feed 5 through which cable 2 can be trained with a loop 8 while enclosing table leg 9 or the like. The length of cable required for this purpose and for connection of the device for protecting can be simply unrolled from device 1, which forms with its side walls a reel 6 round which cable 2 is wound, see FIG. 2. Other winding means are however also possible here, for instance a reel which is suspended rotatingly in the housing and which can be unrolled counter to a spring tension so that cable 2 will never have excess length and will always be taut.

After housing 1 has thus been attached to a fixed object 9 or a part thereof, the outer end of cable 2 is inserted with the connector into a corresponding mating connector of the device for protecting. The theft protection is then activated with (de)activating means in the form of a lock 7 which is provided for this purpose in housing 1 and for which only the rightful user has the correct key. The alarm is now activated and will continuously monitor the integrity of the cable connection. An interruption therein will for instance result in a change in the output impedance or output capacity which can be readily detected with an electrical circuit assumed to be sufficiently known to a person with ordinary skill in the art, and be converted into a trigger signal which causes the alarm means to be set into operation. In order to deactivate the alarm the user uses his/her key again in opposite direction. It is otherwise noted that, instead of a mechanical key, use can also be made of more sophisticated (de)activating means, such as for instance an electronic token or a biometric sensor in the housing or in the device to be protected itself.

In this example use is made of connection of the theft protection to a USB port of an optionally portable computer. The operating system thereof supports a constant monitoring of the situation of such a port, and undertakes a specific action in the case of a change therein. Loaded into the protected device is a software routine which is adjusted to the use with the other part of the theft protection for the purpose of immediately encrypting or even deleting data which are possibly stored in the device and which are possibly confidential in the case the protected cable connection is interrupted. These data at least will thus not fall into the hands of third parties in the event the protective device is still removed.

All in all a particularly elegant, but no less effective theft protection is obtained as a result of the device which does not impede working with the device, or hardly so, and which is exceptionally practical in use It should however be apparent that the invention, although further elucidated on the basis of only a single embodiment, is not limited to the given example. On the contrary, many variations and embodiments are still possible within the scope of the invention for the person with ordinary skill in the art. Other fastening means can thus be provided on the housing, for instance in the form of a (hardened) steel loop or hook which is enclosed in the housing by means of locking of closing means arranged for this purpose. The theft protection according to the invention can also be integrated with peripheral equipment for coupling to the device for protecting, such as for instance an external electricity supply, a USB hub, external memory means such as an external hard disc, an external optical disc unit, ROM or RAM memory, and in particular an electronic encryption token which is essential for the decryption of data stored in the device in encrypted manner, whereby these data become unreadable when the token is separated from the device. The housing thereof is in that case embodied with effective fastening means for a firm attachment to a fixed object, and the components of the theft protection are integrated therein, wherein the power supply can moreover be shared mutually.

For the housing use is made in the embodiment of plastic parts which are joined together, for instance of an impact-resistant plastic such as ABS, a strong polyethylene (HDPE) or polypropylene (HDPP) which can be injection-moulded relatively easily, or a clear translucent plastic such as polymethyl methacrylate (PMMA) for the purpose of an attractive appearance. It is however also possible to have recourse instead to more robust materials such as metal and steel or natural products such as wood.

The protection according to the invention can also be combined with a more conventional protection in the form of a steel cable, which is then likewise connected to optionally the same fixed object and is coupled to the device by means of a lock closure. A further integration can be achieved here by combining the steel cable and the cable of the protection according to the device in one strand.

The invention claimed is:

1. A theft protection system for an electronic device, comprising:

an electrical cable with a coupling connector for coupling to a corresponding coupling connector of the device;

a housing separate from the device;

means for alarming which is accommodated by the housing, the means for alarming being connected to the cable, the means for alarming comprising means for detection which are adapted and able to detect an interruption of an electrical cable connection via the cable with the coupling connector to the corresponding coupling connector of the device, the means for alarming also comprising means for signaling configured to generate an alarm signal when the interruption is detected, wherein the housing is provided with means for fastening for a firm and reliable manually releasable mechanical attachment of the housing to a fixed object, the means for fastening comprise said electrical cable and a cable through-feed on the housing for far receiving a loop of the cable around the fixed object to form said attachment, and the electrical cable coupling connector connects to a standard data port of the electronic device.

2. The theft protection system as claimed in claim 1, wherein the housing is provided with means for winding for enclosing the cable in an at least partly rolled-up state.

3. The theft protection system as claimed in claim 2, wherein the housing forms a reel on which the cable is received in at least partly rolled-up state.

4. The theft protection system as claimed in claim 1, wherein the housing of the means for alarming also comprises an electric power supply for the device, and that the cable comprises a power supply cable of the device.

5. The theft protection system as claimed in claim 4, wherein the electric power supply is shared with the means for alarming.

6. The theft protection system as claimed in claim 1, wherein the coupling connector comprises a universal serial bus connector and the corresponding connector comprises a universal serial bus port of the device.

7. The theft protection system as claimed in claim 6, wherein a protection routine is loaded into the device, at least during operation, and is embodied to protect data present in the device against unauthorised access when an interruption of the cable connection is detected.

8. The theft protection system as claimed in claim 1, wherein the means for alarming are adapted and independently able to generate at least one alarm signal from a group comprising an auditory signal, an optical signal and a vibrating alarm.

9. The theft protection system as claimed in claim 1, wherein the means for alarming comprise (de)activating means which can only be operated by a rightful user.

10. The theft protection system as claimed in claim 1, wherein the electronic device is a portable computer, a mobile telephone or a PDA.

11. A theft protection system for an electronic device, comprising:

an electrical cable with a coupling connector for coupling to a corresponding coupling connector of the device;

a housing separate from the device;

an alarm which is accommodated by the housing, the alarm being connected to the cable, the alarm comprising a detector adapted and able to detect an interruption of an electrical cable connection via the cable with the coupling connector to the corresponding coupling connector of the device, the alarm also comprising a signaler configured to generate an alarm signal when the interruption is detected, wherein the housing is provided with a fastener for a firm and reliable manually releasable mechanical attachment of the housing to a fixed object, the fastener includes said electrical cable and a cable through-feed on the housing for receiving a loop of the cable around the fixed object to form said attachment, and the electrical cable coupling connector connects to a standard data port of the electronic device.

12. The theft protection system as claimed in claim 1, wherein the housing is provided with a winding device for enclosing the cable in an at least partly rolled-up state.

13. The theft protection system as claimed in claim 11, wherein the housing forms a reel on which the cable is received in at least partly rolled-up state.

14. The theft protection system as claimed in claim 1, wherein the housing of the alarm also comprises an electric power supply for the device, and that the cable comprises a power supply cable of the device.

15. The theft protection system as claimed in claim 14, wherein the electric power supply is shared with the alarm.

16. The theft protection system as claimed in claim 11, wherein the coupling connector comprises a universal serial bus connector and the corresponding connector comprises a universal serial bus port of the device.

* * * * *